J. HARRIS.
METHOD OF AND APPARATUS FOR MEASURING POWER.
APPLICATION FILED APR. 16, 1908.
925,180.
Patented June 15, 1909.
4 SHEETS—SHEET 1.
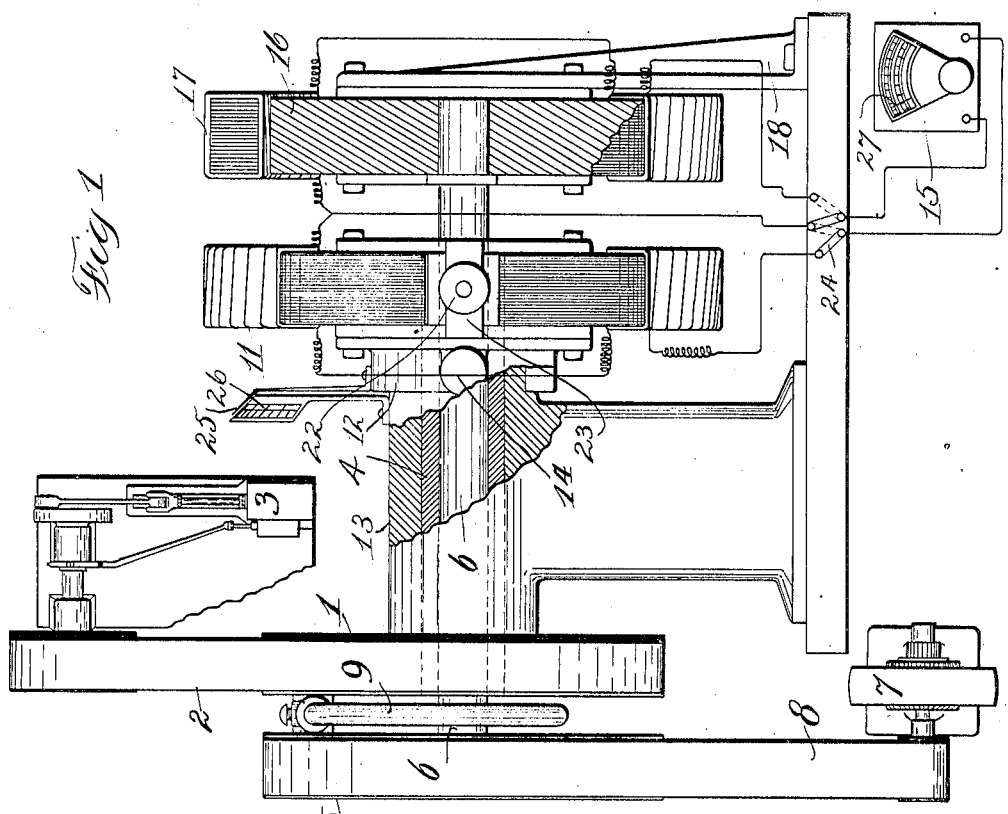
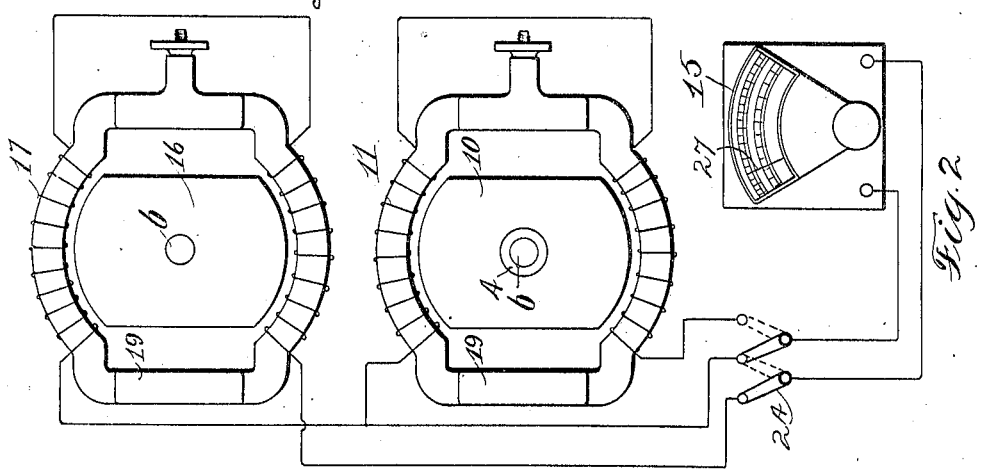
WITNESSES:
INVENTOR.
Jesse Harris
BY
ATTORNEY.

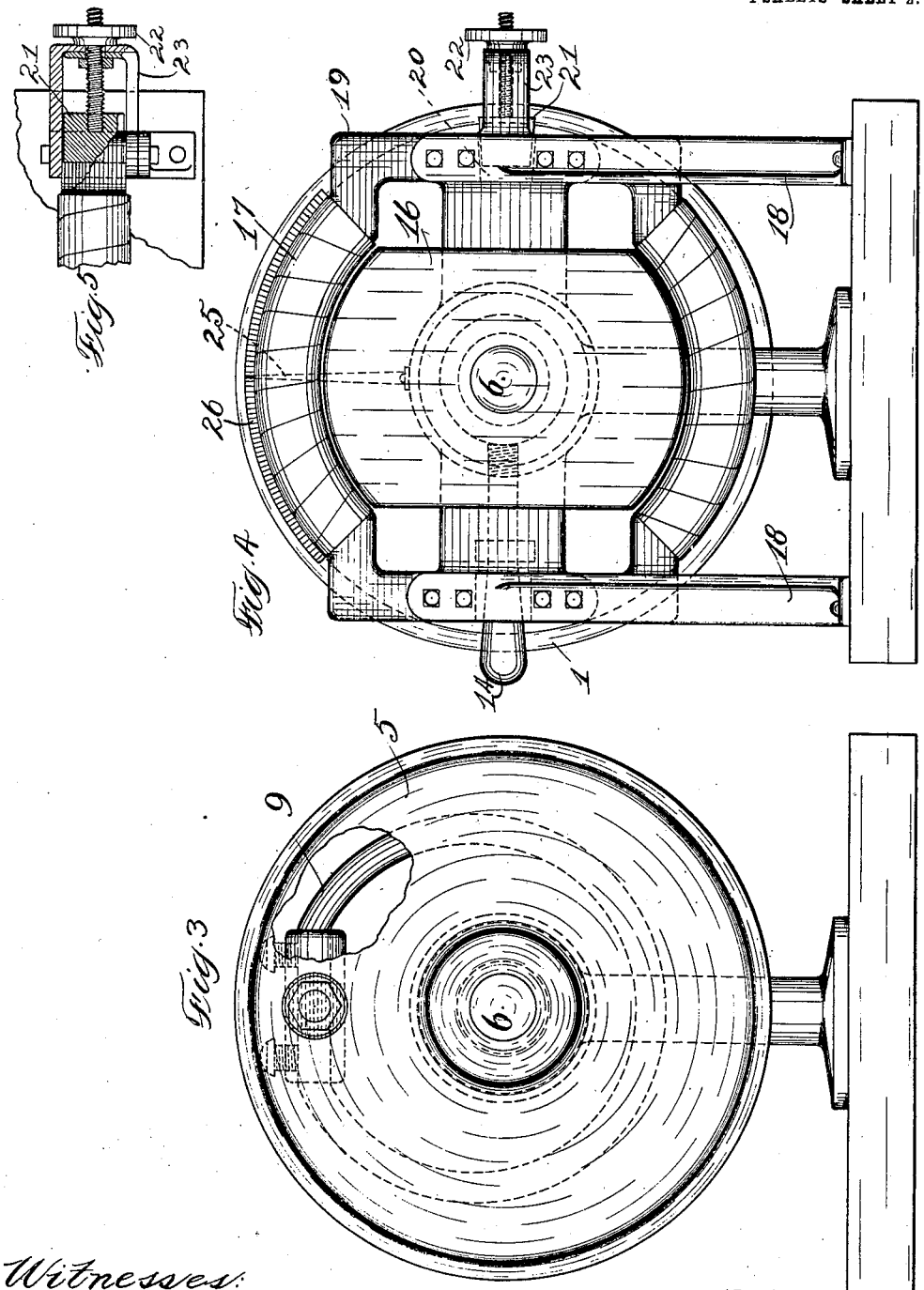

J. HARRIS.
METHOD OF AND APPARATUS FOR MEASURING POWER.
APPLICATION FILED APR. 16, 1908.
925,180.
Patented June 15, 1909.
4 SHEETS—SHEET 3.
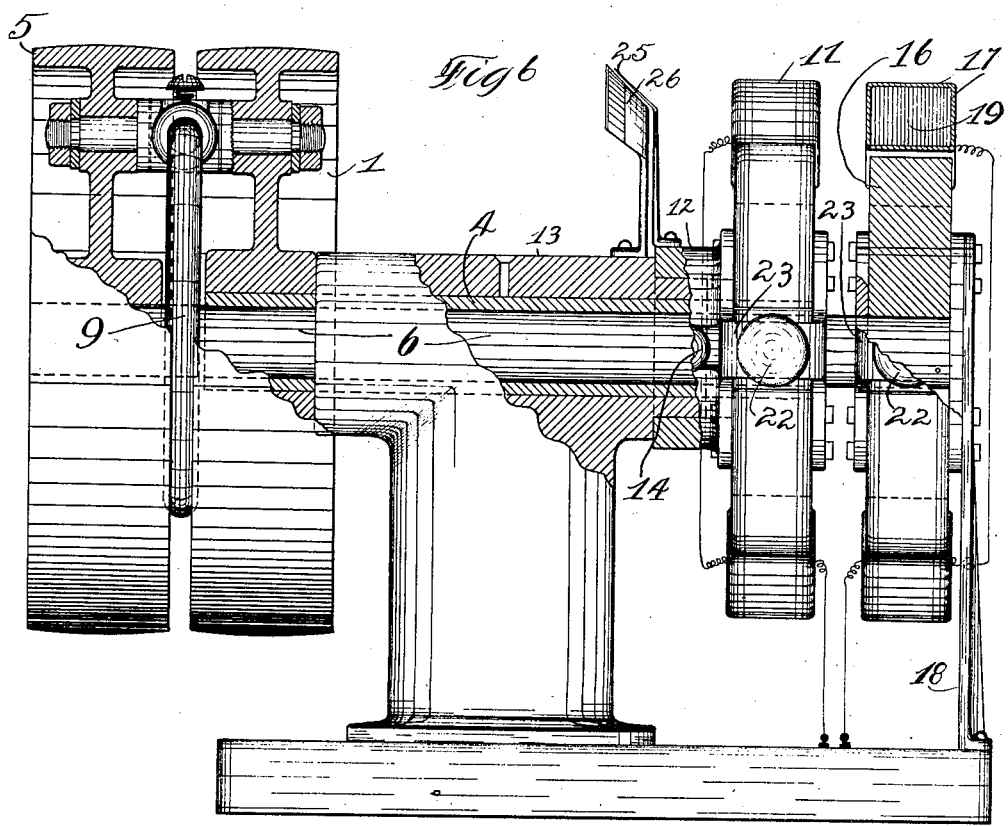
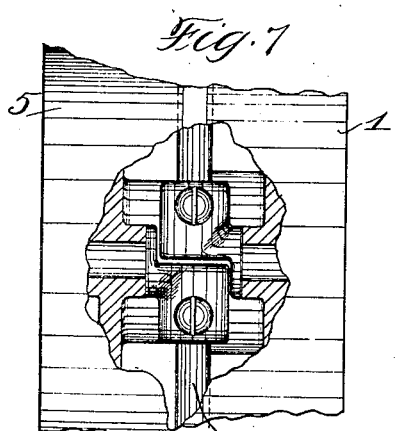
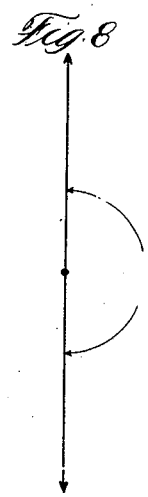
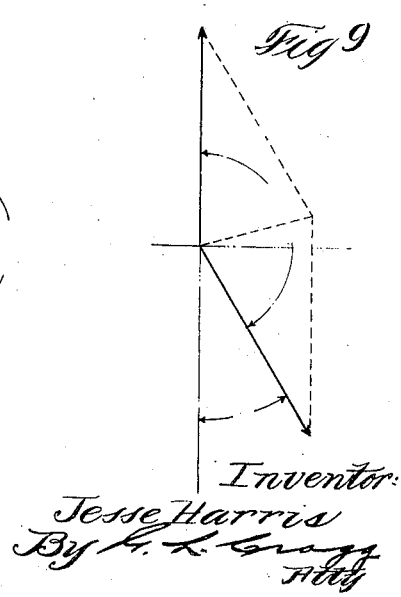
Inventor:
Jesse Harris

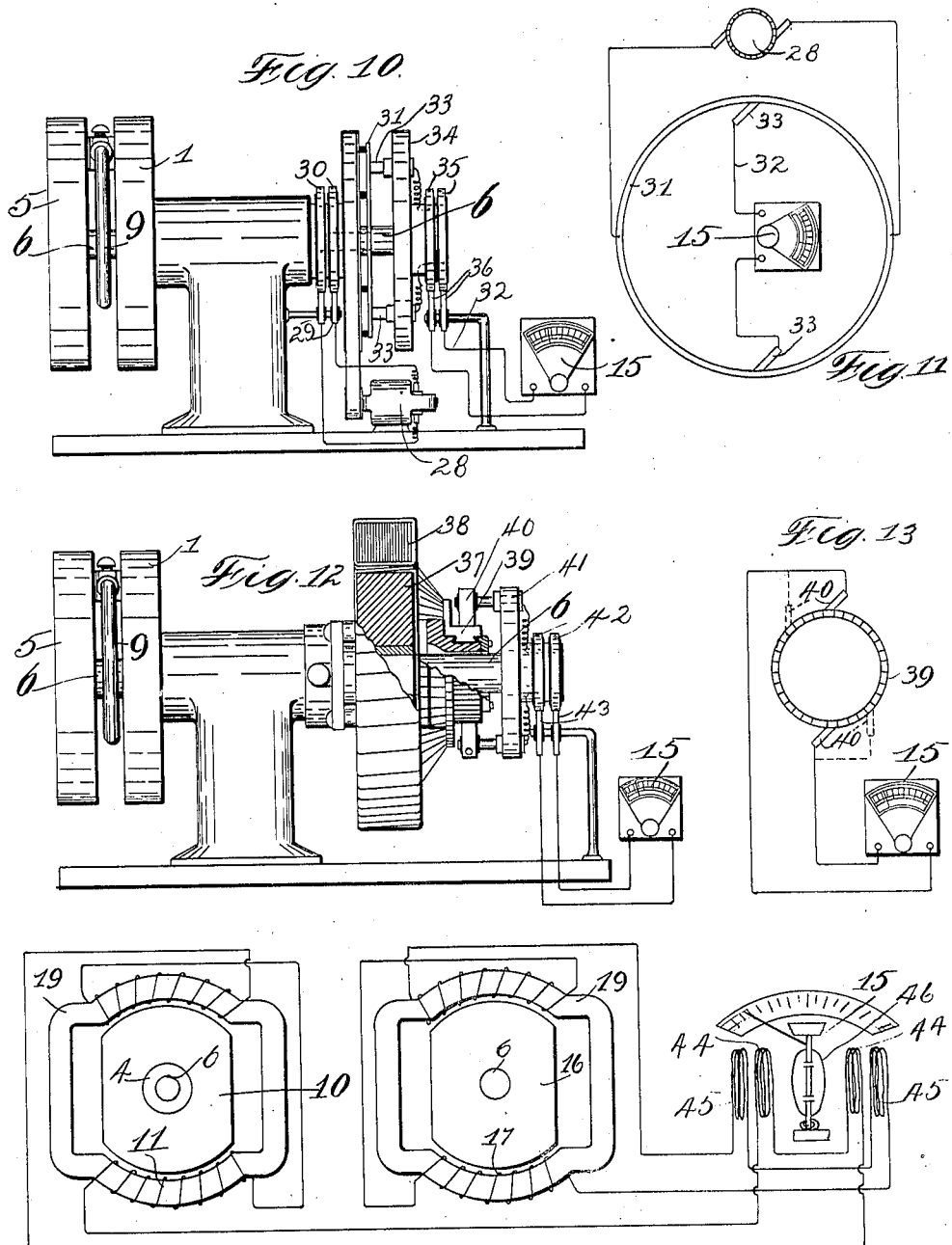

Bottom# UNITED STATES PATENT OFFICE.

JESSE HARRIS, OF WEST LAFAYETTE, INDIANA, ASSIGNOR OF ONE-HALF TO CHARLES R. MOORE, OF WEST LAFAYETTE, INDIANA.

METHOD OF AND APPARATUS FOR MEASURING POWER.

No. 925,180.  Specification of Letters Patent.  Patented June 15, 1909.

Application filed April 16, 1908. Serial No. 427,515.

*To all whom it may concern:*

Be it known that I, JESSE HARRIS, a citizen of the United States, residing at West Lafayette, in the county of Tippecanoe and State of Indiana, have invented a certain new and useful Improvement in Methods of and Apparatus for Measuring Power, of which the following is a full, clear, concise, and exact description, reference being had to the accompanying drawings, forming a part of this specification.

My invention relates to a method of and apparatus for measuring power, and has for its objects the provision of ways and means whereby transmitted power may be determined without calculation.

Hitherto dynamometers have merely indicated certain values from which to calculate the power, the calculations necessitated being frequently long and laborious. Moreover, it is necessary to maintain the conditions constant during the time that the values are being determined, which is very frequently difficult, oftentimes requiring considerable preparation and experimentation.

I have devised a dynamometer using little power itself and which will effect instant indication of the power exerted, the dynamometer being so constructed as to enable the torque and speed jointly to effect the power measurement.

In one embodiment of my invention, I employ a driving transmission element (that element directly operated, for example, by a prime mover) and a driven transmission element (that element through which, for example, the load is directly operated), and couple these transmission elements by means of a resilient connection which will permit relative movement of said transmission elements proportional to the torque. The resilient coupling uniting the transmission elements is desirably of such a nature that if there be no load in connection with the driven transmission element, the coupling will permit no relative movement between the transmission elements. When a load is in connection with the driven transmission element, the resilient coupling will permit a movement of the driven transmission element with respect to the driving transmission element that will be proportional to the torque required to move the load. The dynamometer, in addition to the driving and driven transmission elements and the resilient coupling uniting the same, also includes a reading instrument and two actuating elements for jointly operating upon the reading instrument. One of these actuating elements is operated by the driving transmission element and the other actuating element is operated by the driven transmission element, and the joint effect of the two actuating elements upon the reading instrument is modified by the relative movement between the transmission elements, which relative movement is permitted by the resilient coupling uniting said transmission elements.

In the preferred embodiment of the invention, each actuating element acting by itself upon the reading instrument, effects a movement of the reading instrument which is proportional to the speed. When torque is present (which is the case when there is a load), the joint effect of these two actuating elements upon the reading instrument is such as to produce a movement of the reading instrument which corresponds to the product of the torque and speed, or, in other words, which corresponds to the power transmitted by the transmission elements.

In the preferred embodiment of my invention, I employ a mechanism for the reading instrument which is constructed after the fashion of a volt meter; a recording volt meter construction being employed when a record of the power transmitted is to be kept, and an indicating volt meter construction being employed if it is desired to tell, for the time being only, what power is transmitted. The actuating elements which operate upon the volt meter construction are preferably in the form of devices each for impressing pressure upon the motor of the reading instrument, these actuating elements serving, when there is no torque, to impress electro-motive forces upon the motor of the reading instrument in opposition to such an extent as to cause no operation of the reading instrument. When there is torque present, however, the opposition of the electro-motive forces impressed upon the reading instrument is reduced, so that a movement of the reading instrument is permitted which corresponds to the product of the speed and the torque. I desirably provide each reading instrument with two scale pans or sets of markings, one scale merely for indicating the speed, the speed being proportional to the electro-motive force impressed by either actuating element alone, while the other scale is marked to measure the power transmitted, which power is proportional to the product of the speed and the torque.

Where the instrument is designed to be influenced by electro-motive forces having degrees of counter-action which vary upon variation of torque, I desirably employ for the actuating elements operated by the transmission elements small single phase alternating current pressure generators constructed substantially alike, the rotor of one generator being directly operated by one transmission element, while the rotor of the other generator is operated by the other transmission element. The stators of these generators are desirably wound to constitute armatures, while the rotors may, if desired, be in the form of permanent magnets, by rotation whereof current is induced in the armature windings. The windings of the stators or armatures are included in serial relation with each other and with the motor part of the reading instrument. When the transmission elements are operating without load, the rotors are desirably so related that the electro-motive forces induced in the armature windings, are in exact opposition, or one hundred eighty (180) degrees apart, and inasmuch as the electro-motive forces generated by the operation of the rotors in their armature windings are desirably alike, it is apparent that there is no effective or resultant electro-motive force impressed upon the motor of the reading instrument. However, when a load is operated by the driving transmission element and the driven transmission element through the resilient coupling uniting the transmission elements, the driven transmission element becomes out of phase with the driving transmission element; that is, the driven transmission element is caused to lag to an extent proportional to the torque, the resilient coupling being preferably so designed as to permit of the lag of the driven element with respect to the driving element an extent proportional to the torque. Obviously, the rotor actuated by the driven element lags behind the rotor actuated by the driving element, an extent in proportion to and desirably the same as the lag of the driven transmission element behind the driving transmission element. Therefore, when a load is operated by the transmission elements, the currents generated by the pressure generators are out of phase an extent proportional to the torque, whereby the opposition of the electro-motive forces impressed upon the motor of the reading instrument is lessened to an extent which will cause the resultant electro-motive force to be proportional to the power transmitted. This resultant electro-motive force is impressed upon the motor of the reading instrument, whereby said motor operates an indicator to denote the power transmitted. For example, if the torque should double while the speed remains constant, the indicated power will be doubled, or if the speed should double and the torque remain constant, the indicated power will be doubled. If both torque and speed should be doubled, then the indicated power will be four times as great.

I will explain my invention more fully by reference to the accompanying drawings, which not only illustrate the preferred embodiment thereof which is described above, but also other embodiments of the invention.

In the drawings—Figure 1 is a view in elevation, partially in section, of an instrument constructed in accordance with one embodiment of my invention, its association with a prime mover and a load being diagrammatically indicated. Fig. 2 is a diagram illustrating the system of circuits employed with the apparatus indicated in Fig. 1. Fig. 3 is an end view of the dynamometer mechanism looking toward the driven pulley. Fig. 4 is a view of the dynamometer mechanism looking toward the generators entering into the dynamometer construction. Fig. 5 is a plan view of a detail of construction. Fig. 6 is a view in elevation, partially in section, of the dynamometer mechanism showing further details of construction. Fig. 7 is a partial plan view illustrating the resilient coupling between the driving and driven pulleys. Figs. 8 and 9 are two vector diagrams illustrating two phase relations of the electro-motive forces due to the generators operated by the driving and driven elements of the dynamometer. Figs. 10 and 11 illustrate a modification of the preferred form of my invention. Figs. 12 and 13 illustrate another modification of the preferred form of my invention. Fig. 14 illustrates another modification of the preferred form of my invention.

Like parts are indicated by similar characters of reference throughout the different figures.

The driving transmission element includes a driving pulley 1 operated by a driving belt 2 driven by a prime mover 3, there being also included in the driving transmission element a sleeve or quill shaft 4 in fixed relation with the pulley 1. The driven transmission element includes a driven pulley 5 and a shaft 6 fixed with respect to pulley 5, the driven pulley 5 being in driving relation with the load, indicated at 7, by means of a load-driving belt 8. Were it not for the resilient coupling to be described, which unites the pulleys and their shafts, the driving pulley 1 would operate without moving the driven pulley 5. The resilient coupling is desirably in the form of a stiff spring 9 which has its ends suitably secured near the peripheries of the pulleys 1 and 5. This spring is desirably of such a nature that it will permit a rotation of the pulley 1 with respect to the pulley 5, which is proportional to the torque exerted upon the load through said spring, there obviously being no relative movement of the pulleys when there is no load, and a maximum relative movement of the pulleys within the range of the spring, when the predetermined maximum load is present.

The driving transmission element carries upon its quill shaft 4 a rotating field element 10 (Fig. 2) which may be a permanent field magnet or of other character to present a magnetic field to the armature winding. The field presented by the rotor 10 is revolved in the presence of a winding 11 of the armature or stator, which armature has a hub 12 rotatably mounted upon a reduced portion of the bearing 13 in which the quill shaft 4 rotates. The armature or stator 11 is normally stationary, but may be rotated upon its support by means of the handle 14 for a purpose hereinafter to be set forth.

The stator and rotor of the generator as here organized and assembled, constitute a well known form of single phase alternating current generator and constitute one of the actuating elements having effect upon the reading instrument 15. The other actuating element having influence upon the reading instrument 15 is of similar construction and arrangement to the actuating element associated with the driving transmission element, the rotor 16 (similar in function to the rotor 10) being mounted upon the shaft 6 while the stator 17 (similar to the corresponding part 11 of the companion actuating element) is stationarily mounted upon brackets 18. Each rotor operating within its stator is capable of producing a single phase sine-wave current in the winding of the stator, and the currents in the windings of both stators are desirably of the same wave form and periodicity, to which end the rotors are alike. The electro-motive forces generated in the windings of the stators are preferably identical in value, and, in order that this may be assured, I desirably provide some means for regulating the reluctance of the magnetic circuits provided for the windings of the stators, to which end the core of each stator is preferably constructed as illustrated most clearly in Figs. 4 and 5, wherein such cores 19 are provided with gaps 20 into and out of which blocks of iron may be moved for the purpose of adjusting the reluctance of the magnetic circuits, there being employed in association with each stator a reluctance-regulating block such as the block 21, which may be moved back and forth within a gap in the associated core 19 by means of a thumb-screw 22 threaded into the block and journaled at its end in a bracket 23 secured to the stator. Not only do the reluctance-adjusting blocks serve to equalize the voltage due to each generator, but they also serve to rectify any failure of the rotating permanent magnets 10, 16, to maintain their strength. I employ switching mechanism 24, whereby the winding of each stator may alone be included in circuit with the reading instrument 15 to measure speed, and whereby the windings of the stators and the reading instrument 15 may be included in serial relation with each other to measure power, the scale pan 27 having two sets of markings, one for speed or electromotive force values and the other for power values.

In using the embodiment of the invention so far described, the prime mover is brought to speed, and the armature or stator windings are individually included in circuit with the reading instrument to determine the electro-motive forces generated by the rotors. If the electro-motive forces generated are unequal, they are made equal by the operation of one or both of the reluctance-regulating blocks 21, whereafter the switching mechanism 24 is operated to throw the windings of both stators in series with each other and with the reading instrument to enable the apparatus to measure power, whereafter the load is imposed upon the prime mover, whereupon the power transmitted may be read at the instrument 15.

In order to determine the turning effort applied to the transmission elements by the prime mover, the handle 14 may be grasped to rotate the armature or stator 11 upon its bearing until the electro-motive forces generated in the stator windings of both pressure generators are again brought into exact opposition, the reading instrument 15 reading zero when exact opposition is secured. The pointer or index 25 mounted upon the hub 12 moving with the stator 11, is passed over the scale 26 by means of the handle 14, which scale is marked to enable the determination of the angular deflection between the driving and driven transmission elements, which displacement is proportional to the torque. After the torque has been determined, the stator which has been rotated by the handle 14 is restored to its initial position, to enable the apparatus to measure speed or power, according to the position of the switching device 24.

The scientific principles of the apparatus described specifically in connection with Figs. 1 to 9, inclusive, will be readily understood by those skilled in the art, and I do not, therefore, deem a further description thereof to be essential, though I will mention the vector diagrams shown in Figs. 8 and 9, that illustrate two phase relations of many that may exist between the electro-motive forces impressed upon the measuring instrument 15 by the generators that include the stator windings 11 and 17. In Fig. 8 the electro-motive forces are illustrated in exact opposition, which is the condition that obtains when there is no load imposed upon the prime mover. Fig. 9 is given to illustrate a modification of the phase relation between electro-motive forces that is due to the imposition of a load upon the prime mover, it being, of course, understood that the phase relation between the electro-motive forces varies according to the load imposed upon the prime mover.

I will now describe some departures from the embodiment of the invention illustrated in Figs. 1 to 7, inclusive, that has been specifically described. In Figs. 10 and 11 I have illustrated an apparatus that includes certain elements generally similar, which elements have been given similar characters of reference. In Fig. 10 I have shown a suitable form of direct current generator, as a small magneto machine 28, which is driven by one of the shaft sections, for example, the quill shaft section 4, though any means for imparting motion to the generator 28 by the prime mover 3 may be employed, whereby said generator is caused to generate current whose pressure is proportional to the speed of the prime mover. The current from this generator is conveyed by means of brushes 29 and slip rings 30 to a closed ring conductor 31, composed preferably of resistance wire, and traveling with one of the shaft sections, say the shaft section 4. The generator 28 is desirably connected by means of the aforesaid slip rings and brushes to diametrically opposite points of the high resistance conductor 31, so that in the absence of any other connections with said conductor, the electromotive forces therein are equal and opposing. I, however, provide a bridge 32 across said conductor, the elements 31, 32 constituting a Wheatstone bridge, the conductor 32 including the reading instrument 15. The terminals of the conductor 32 are in the form of brushes 33 carried by a mounting 34 fixed upon the shaft section 6. The brushes 33 are so positioned that when there is no load imposed upon the prime mover, said brushes will engage portions of the ring-like conductor 31 that are displaced ninety (90) degrees away from the connections of said conductor 31 with the generator 28, but inasmuch as the brushes 33 are provided upon one shaft section 6 and the ring-like conductor 31 is carried upon the other shaft section 4, the positions of the brushes 33 will change upon relative movement between said shaft sections arising when a load is imposed upon the prime mover, whereupon the element 15 will have current impressed upon it that will effect an actuation of its indicating needle to measure the power transmitted, for the shifting of the brushes disturbs the balance of the Wheatstone bridge, whereby the measurement of the power may be effected. For sake of convenience, the brushes 33 are connected with slip rings 35 (Fig. 10), while the instrument 15 is provided with terminal brushes 36 engaging said slip rings 35. In Figs. 12 and 13 I have illustrated a direct current generator having a field 37 and an armature 38, said field being carried by one of the shaft sections, as, for example, the shaft section 4. The commutator 39, of course, is fixed with respect to the armature 38. The brushes 40 are mounted upon a brush carrier 41 and move with the other shaft section 6. When there is no load, the brushes 40 are at points of zero potential. When there is a load, the brushes move from the points of no potential to points of higher potential, the re-location of the brushes being determined by the extent of the angular displacement between the shaft sections 4 and 6, as will be understood. Thus when there is no load, the power reading instrument 15 will not be actuated, but when there is a load, this reading instrument will be operated to measure the power due to the displacement of the brushes from the points of zero potential. The connection between the brushes 40 and the reading instrument 15 is desirably effected by means of slip rings 42 that travel with the brushes 40 and brushes 43 constituting terminals of the reading instrument 15 and resting upon the slip rings 42.

In Fig. 14 I have illustrated the reading instrument 15 as having two independent energizing circuits acting with maximum opposition when there is no load, which opposition varies according to the load. One of these circuits includes two coils 44, which coils are supplied with current from the stator winding 11. The other of these circuits includes coils 45, which latter coils are in circuit with the stator winding 17. Currents traveling in coils 44 produce fields acting in opposition to the fields produced by the currents flowing in the coils 45, the joint action of these fields upon the iron vane armature 46 effecting movement proportional to the power. In the arrangement of Fig. 14 the relative directions of the windings 11 and 17 is immaterial, providing the coils 44 and 45 have proper direction of winding to enable the fields due thereto to have the effect stated.

From the descriptions of the preferred embodiments of my invention, it will be observed that there is a fundamental underlying method of operation, which includes the employment of two electro-motive forces due to the coupled members of the dynamometer and which have varying degrees of opposition, according to the deflection permitted between said members of the dynamometer by the resilient coupling uniting the same. The said electro-motive forces act upon a common reading instrument and may be produced or controlled in a variety of ways by the coupled members of the dynamometer without departing from the spirit of my invention, and I do not, therefore, wish to be limited to the method of generating the electro-motive forces, nor of their control, nor to the manner in which the said electro-motive forces have action upon the reading instrument.

Having particularly described the preferred embodiments of my invention and not limiting myself thereto, I claim as new and desire to secure by Letters Patent the following:—

1. A dynamometer including a driving element, a driven load-operating element, a resilient coupling uniting the driving and driven elements, means for producing opposing electro-motive forces, the extent of whose opposition is governed by the relative movement between said driving and driven elements permitted by the resilient coupling, and a power reading instrument whose operation is due to said electro-motive forces.

2. A dynamometer including a driving element, a driven load-operating element, a resilient coupling uniting the driving and driven elements, means for producing opposing electro-motive forces, the extent of whose opposition is governed by the relative movement between said driving and driven elements permitted by the resilient coupling, and a power reading instrument operated by the resultant of said electro-motive forces.

3. A dynamometer including a driving element, a driven load-operating element, a resilient coupling uniting the driving and driven elements, means for generating opposing electro-motive forces governed by said driving and driven elements, the degree of opposition of said electro-motive forces being governed by the relative movement between said driving and driven elements permitted by the resilient coupling, and a power reading instrument subject to the action of said electro-motive forces.

4. A dynamometer including a driving element, a driven load-operating element, a resilient coupling uniting the driving and driven elements, means for generating opposing electro-motive forces governed by said driving and driven elements, the degree of opposition of said electro-motive forces being governed by the relative movement between said driving and driven elements permitted by the resilient coupling, and a power reading instrument subject to the resultant of said electro-motive forces.

5. The method of measuring power, which consists in setting up electro-motive forces by driving and driven elements, resolving said electro-motive forces into a force proportional to the product of the speed and torque and effecting the operation of a reading instrument by said resultant force.

6. The method of measuring power, which consists in setting up counter-electro-motive forces proportional to velocity, effecting displacement of phase between said electro-motive forces proportional to the torque and effecting the operation of a reading instrument by the resultant of said counter-electro-motive forces.

7. The method of measuring power, which consists in setting up component forces proportional to velocity, effecting displacement of phase between said component forces proportional to the torque and effecting the operation of a reading instrument by the resultant of said component forces.

In witness whereof, I hereunto subscribe my name.

JESSE HARRIS.

Witnesses:
RAY C. TAYLOR,
JOHN D. CRAMER.